G. D'AGOSTINO.
RUNNER ATTACHMENT FOR MOTOR VEHICLES.
APPLICATION FILED MAR. 31, 1916.
1,214,437.
Patented Jan. 30, 1917.
2 SHEETS—SHEET 1.
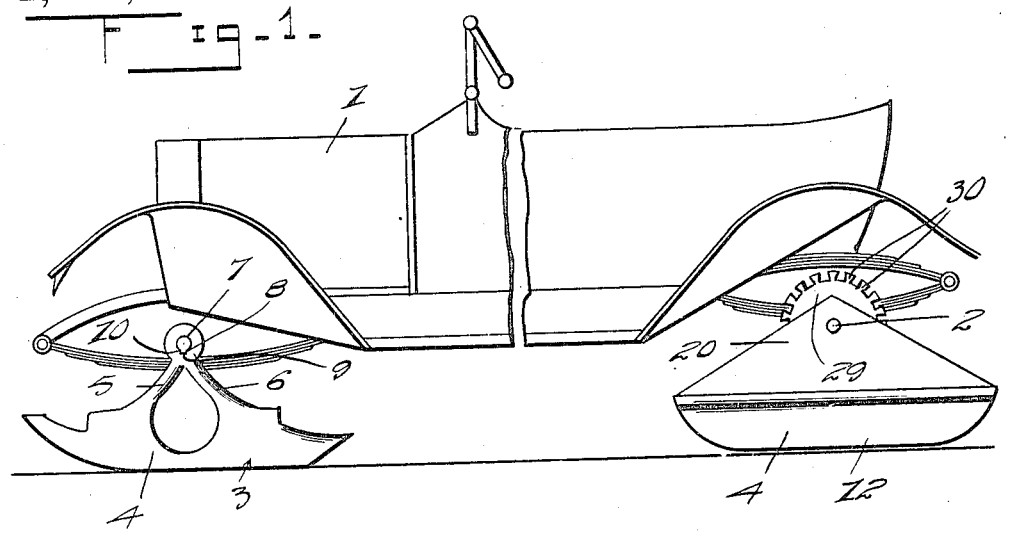
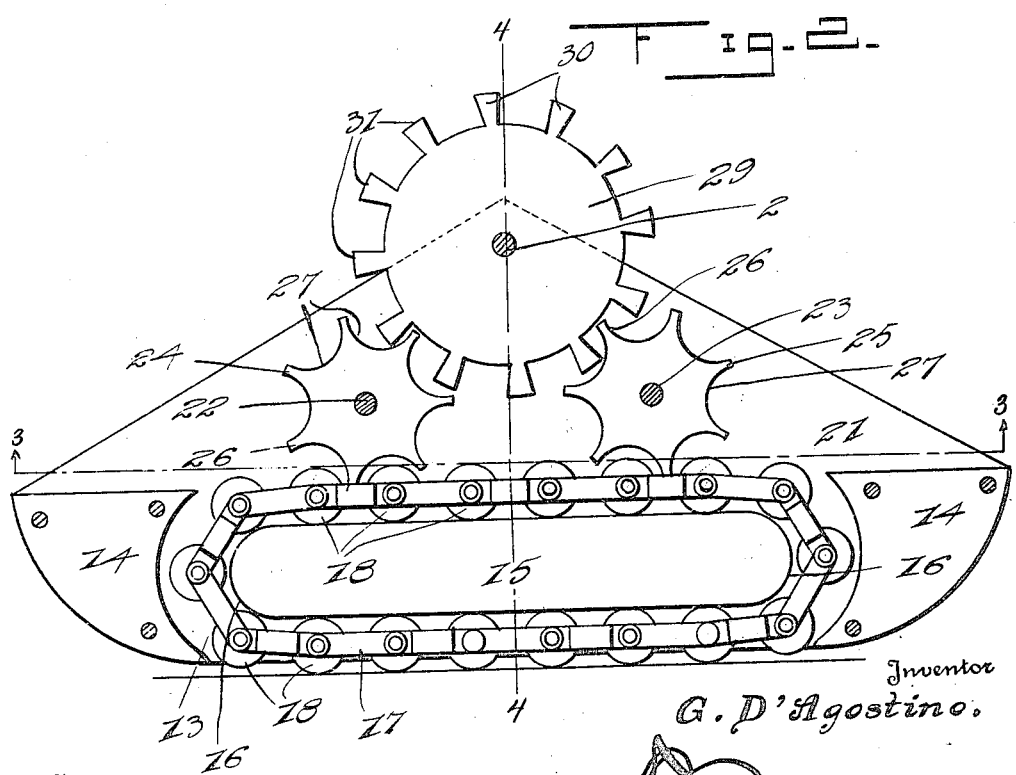
Witnesses
C. N. Bealle.
Rohr Meyer.
Inventor
G. D'Agostino.
By [signature], Attorney

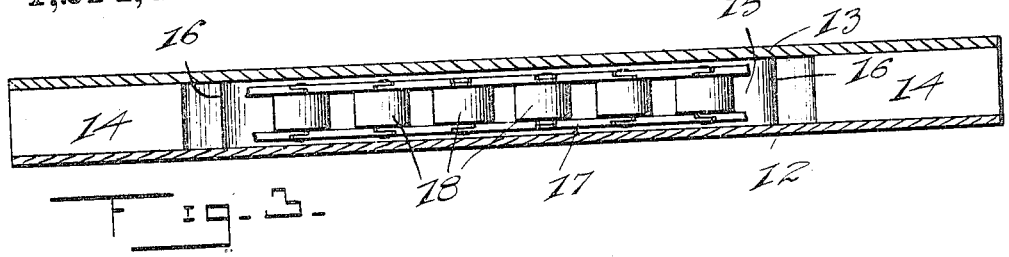
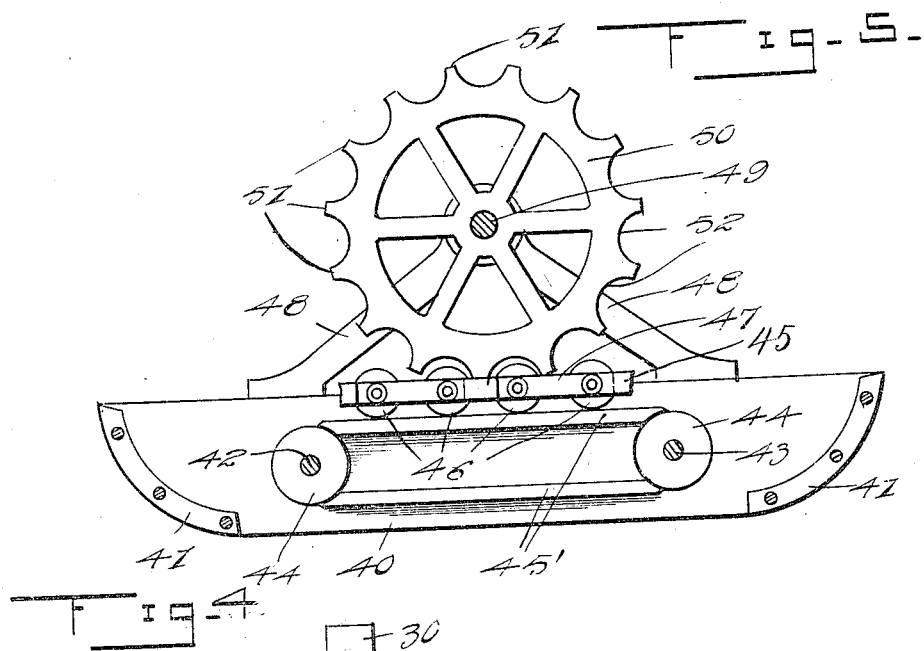
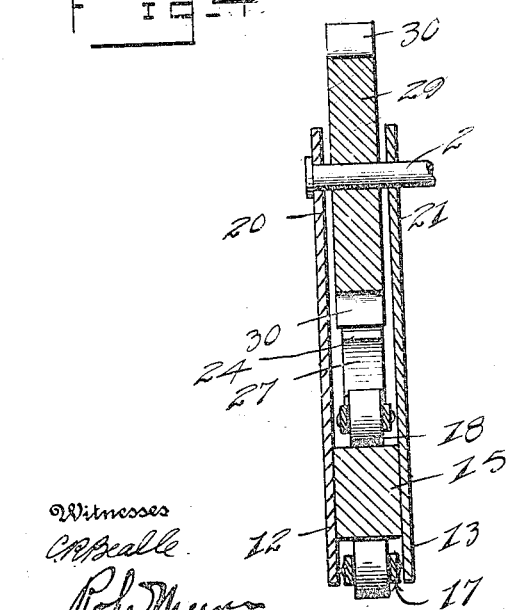

UNITED STATES PATENT OFFICE.

GIUSEPPE D'AGOSTINO, OF UTICA, NEW YORK.

RUNNER ATTACHMENT FOR MOTOR-VEHICLES.

1,214,437.  Specification of Letters Patent. Patented Jan. 30, 1917.

Application filed March 31, 1916. Serial No. 88,040.

*To all whom it may concern:*

Be it known that I, GIUSEPPE D'AGOSTINO, a citizen of the United States, residing at Utica, in the county of Oneida and State of New York, have invented certain new and useful Improvements in Runner Attachments for Motor-Vehicles; and I do hereby declare the following to be a full, clear, and exact description of the invention, such as will enable others skilled in the art to which it appertains to make and use the same.

This invention relates to runners which are adapted for attachment to various types of motor vehicles, for facilitating the propelling of the vehicles over snow, ice or in other conditions wherein a sleigh would be necessary.

Another object of this invention is to provide a specially constructed runner, which is applicable for attachment to the spindle end of the rear drive axle of the motor vehicle, which includes a caterpillar tread, for use in coaction with runners and to provide means for operating the caterpillar treads by the rotation of the drive axle of the motor vehicle.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the motor vehicle equipped with the improved runner. Fig. 2 is a vertical section through one of the propelling runners. Fig. 3 is a section on the line 3—3 of Fig. 2. Fig. 4 is a vertical section on the line 4—4 of Fig. 2, and Fig. 5 is a vertical section of a modified form of the propelling runner.

Referring more particularly to the drawings, 1 designates the motor vehicle of any ordinary type which has a drive axle 2, which is driven by the usual type of prime mover used for propelling the vehicle. In attaching the improved runner to the motor vehicle, the wheels are removed from the front and rear axles, and runners 3 and 4 are mounted upon the spindle ends of the front and rear axles respectively. The front runners 3 comprise a runner body 4 which has arms 5 and 6 attached to its upper end and extending upwardly therefrom. The arms 5 and 6 converge at their upper ends and a bearing 7 is formed integrally therewith, which bearing is provided with a centrally disposed opening 8 for receiving the end of the front axle. A key 9 is inserted through a key way 10 formed in the bearing 7 and into the shaft of the turn axle for securely holding the front runners 3 attached to the end of the front axle and to prevent independent movement of the runner with respect to the axle.

The rear runners 4 are identically constructed and each of them comprises a pair of spaced runners 12 and 13, which are connected by end pieces 14. The runner 12 has a block 15 attached thereto which extends across the face of the inner surface of one runner to the other. The ends 16 of the blocks 15 are rounded, as is clearly shown in Fig. 2 of the drawing. A caterpillar tread generically indicated by the numeral 17, is mounted about the block 15, for travel thereon and it comprises a plurality of cylindrical spurs 18 which are connected by suitable links. The cylindrical spurs 18 extend a relatively short distance beneath the lower edge of the runners 12 and 13, so that they will engage the snow, ice or other surface over which the motor vehicle is traveling, for the purpose of propelling the vehicle during the operation of the caterpillar tread 17. The cylindrical spurs 18 are held against rotation by the links. Brackets 20 and 21 are secured to the upper edges of the runners 12 and 13 and extend upwardly therefrom. A pair of shafts 22 and 23 are rotatably supported by the brackets 21 and 20 and have toothed wheels 24 and 25 mounted thereon respectively. The spaces between the teeth 26 of the toothed wheels 24 and 25 have curved walls as is clearly shown at 27 for proper engagement with the cylindrical spurs 18 during the rotation of the toothed wheels 24 and 25, for moving the caterpillar tread 17 longitudinally. A relatively large toothed wheel 29 is mounted upon each end of the rear or drive axle 2 of the motor vehicle, and it has a plurality of radiating teeth 30 formed about the periphery of the same, which are adapted for engagement with the teeth 26 for propelling the toothed wheels 24 and 25 by the rotation of the toothed wheel 29. The teeth 30, have their side edges cut angled with respect to the radii of the wheel as is clearly shown in Fig. 2, making their outer ends wider than their inner ends which are connected to the wheel body. The extreme outer ends 31 of the teeth 30 are curved to conform to the curvature of the walls or edges 27 of the wheels 24 and 25 to insure the proper engagement between the teeth 30 and 26 for imparting the rotation of the drive axle 2 to the wheels 24 and 25 for propelling the caterpillar treads 17.

In Fig. 5 of the drawings, a modified form of the driving runner is shown, which includes base runners 40 which are connected by end pieces 41. The runners 40 have a pair of spaced pins 42 and 43 extending therethrough and positioned short distances inwardly from the ends of the runner. Rollers 44 are mounted upon pins 42 and 43 and plates 45' are attached to the runners which extend from one roller to the other, providing a track, in combination with the cylindrical spurs 46, over which the caterpillar tread 45 travels. The treads 45 are composed of a plurality of cylindrical spurs 46 which are connected by suitable links 47. The cylindrical spurs 46 extend relatively short distances above and below the upper and lower edges respectively of the runners 40 so that they will properly engage the surface over which the motor vehicle is passing. A pair of bracket arms 48 is secured to the upper edges of the runners 40 and they rotatably support the drive axle 49 of the motor vehicle. A toothed wheel 50 is mounted upon the axle 49, and has a plurality of teeth 51 formed upon the periphery of the same. The spaces between the teeth 51, about the periphery of the wheel 50, are curved as is clearly shown at 52, to conform to the curvature of the cylindrical spurs 46 so that the wheel during its rotation will properly engage the cylindrical spurs for propelling the tread 45.

In reducing the invention to practice certain minor features of construction, combination and arrangement of parts may necessitate alterations to which the patentee is entitled provided such alterations are comprehended within the scope of what is claimed.

What is claimed is:—

1. A runner attachment for motor vehicles including a pair of spaced runners, a guide structure positioned between said runners, a caterpillar tread for travel about said guide structure and comprising a plurality of cylindrical spurs, links connecting said spurs and holding them against rotation, a toothed wheel positioned outwardly of said tread, the teeth of said toothed wheel adapted to engage said cylindrical spurs for propelling said tread, and means for rotating said toothed wheel.

2. The combination with a motor vehicle including a driving axle, of a runner attachment for said vehicle including a pair of spaced runners, a guiding block secured to one of said runners and extending across the space between the runners, a caterpillar tread mounted for travel about said blocks and comprising a plurality of cylindrical spurs, and links connecting said cylindrical spurs, an upstanding bracket secured to the upper edges of said runners, a pair of stub shafts rotatably supported by said brackets, toothed wheels mounted upon said stub shafts and operatively engaging the cylindrical spurs of said caterpillar tread for operating the tread upon rotation of the toothed wheels, a toothed wheel mounted upon said drive axle and meshing with said first named toothed wheels for rotating the toothed wheels and operating the caterpillar tread upon rotation of the drive axle.

In testimony whereof I affix my signature in presence of two witnesses.

GIUSEPPE D'AGOSTINO.

Witnesses:
 JOE COPPELLO,
 GUI FARRUBA.